(12) United States Patent
Lin et al.

(10) Patent No.: US 9,529,116 B2
(45) Date of Patent: Dec. 27, 2016

(54) PHOTOSENSITIVE RESIN COMPOSITION AND APPLICATION OF THE SAME

(71) Applicant: CHI MEI CORPORATION, Tainan (TW)

(72) Inventors: Bo-Hsuan Lin, Tainan (TW); Jung-Pin Hsu, Tainan (TW); Duan-Chih Wang, Nantou County (TW)

(73) Assignee: CHI MEI CORPORATION, Tainan (TW)

(*) Notice: Subject to any disclaimer, the term of this patent is extended or adjusted under 35 U.S.C. 154(b) by 442 days.

(21) Appl. No.: 14/064,207

(22) Filed: Oct. 28, 2013

(65) Prior Publication Data

US 2014/0124716 A1 May 8, 2014

(30) Foreign Application Priority Data

Nov. 7, 2012 (TW) .............................. 101141318 A

(51) Int. Cl.
G02B 5/23 (2006.01)
G02B 1/04 (2006.01)
G02B 5/22 (2006.01)

(52) U.S. Cl.
CPC ................ *G02B 1/04* (2013.01); *G02B 5/223* (2013.01)

(58) Field of Classification Search
USPC ......................................................... 252/586
See application file for complete search history.

(56) References Cited

FOREIGN PATENT DOCUMENTS

| | | | |
|---|---|---|---|
| CN | 1556939 A | | 12/2004 |
| CN | 101750892 | * | 6/2010 |
| CN | 101807002 A | | 8/2010 |
| CN | 102713756 A | | 10/2012 |
| JP | 02-144502 A | | 6/1990 |
| JP | 03-053201 A | | 3/1991 |
| JP | 2009-180949 A | | 8/2009 |
| TW | 201238979 A | | 10/2012 |
| WO | 2011/122707 A1 | | 10/2011 |
| WO | 2012/029734 A1 | | 3/2012 |
| WO | WO2012029734 | * | 3/2012 |

* cited by examiner

*Primary Examiner* — Monique Peets
(74) *Attorney, Agent, or Firm* — CKC & Partners Co., Ltd.

(57) ABSTRACT

A photosensitive resin composition and application of the same are provided. The photosensitive resin composition comprises an alkali-soluble resin (A), a compound (B) containing vinyl unsaturated group(s), a photo initiator (C), an organic solvent (D), a pigment (E) and a metal chelating agent (F). During a pixel process with an omission of a prebake step, the photosensitive resin composition, which is added with the metal chelating agent (F), can be formed to pixels that is adhered tightly to a substrate.

17 Claims, No Drawings

PHOTOSENSITIVE RESIN COMPOSITION AND APPLICATION OF THE SAME

RELATED APPLICATIONS

This application claims priority to Taiwan Application Serial Number 101141318, filed on Nov. 7, 2012, which is herein incorporated by reference.

BACKGROUND

Field of Invention

The present invention relates to a photosensitive resin composition and a color filter formed by using the same. More particularly, the present invention relates a photosensitive resin composition having a high adhesiveness without pre-bake process.

Description of Related Art

In the conventional method of producing a color filter using a photosensitive resin composition, the photosensitive resin composition was coated on a substrate or a substrate having patterns of a light-shielding layer. The coated photosensitive resin composition was firstly subjected to a pre-bake process to form a dried film. And then, an exposing process and a developing process were performed to form a predetermined pattern, so as to form colorful pixels. The methods of producing colorful pixels were disclosed in some methods such as Japanese Patent Laid-Open Publication No. 1990-144502 and No. 1991-53201.

Moreover, in the technical field of producing a color filter in recent years, there is an improvement of the decreased production time by using low exposure. As to the requirements of a high contrast and a high color purity of the colorful liquid crystal display (LCD) device, more pigments need to add into the photosensitive resin composition. In such condition, during the production of the color filter, irregular stains occurs on the pixel pattern layer at a finished stage of a water-washing step after a developing process. The irregular stains will cause a potential delay of the subsequent checking process, for raising issues such as the decreased production efficiency.

Furthermore, there are some methods to save more production time. In addition to the use of decreased exposure, an omission of the prebake step is recently developed in this industry field. There is a strong need to develop such photosensitive resin composition that is available to the omission of the prebake step and has excellent properties.

The aforementioned specific photosensitive resin composition was disclosed in Japanese Patent Laid-Open Publication No. 2009-180949, which comprised a compound containing epoxypropane and cation polymerized initiator. The photosensitive resin composition could improve the irregular stains and be available to the omission of the pre-bake step.

However, during the omission of the pre-bake step in the pixel process, the pixels formed by the aforementioned photosensitive resin composition were adhered onto the substrate poorly, which was unlikely accepted by the industry field.

Accordingly, there is a need to provide a photosensitive resin composition and an application of the same for improving the disadvantages of the adhesiveness during the omission of the pre-bake step in the pixel process.

SUMMARY

Therefore, an aspect of the present invention provides a photosensitive resin composition. The photosensitive resin composition includes an alkali-soluble resin (A), a compound (B) containing vinyl unsaturated group(s), a photo initiator (C), an organic solvent (D), a pigment (E), and a metal chelating agent (F).

Another aspect of the present invention provides a color filter. The color filter is a pixel color layer formed by the aforementioned photosensitive resin composition after a photolithography.

A further aspect of the present invention provides a liquid crystal display device. The liquid crystal display device includes the aforementioned color filter.

The photosensitive resin composition comprising an alkali-soluble resin (A), a compound (B) containing vinyl unsaturated group(s), a photo initiator (C), an organic solvent (D), a pigment (E), and a metal chelating agent (F) all of which are described in detail as follows.

Alkali-Soluble Resin (A)

The alkali-soluble resin (A) of the present invention includes a compound polymerized by a mixture, and the mixture includes a first unsaturated monomer (a-1) containing a carboxylic acid group, a second unsaturated monomer (a-2) containing an alicyclic group, and a third unsaturated monomer (a-3).

The aforementioned first unsaturated monomer (a-1) is selected from the group consisting of acrylic acid, methacrylic acid, 2-methyl-acryloyl ethoxy acid esters, crotonic acid, α-chloro acrylic acid, ethyl acrylic acid, cinnamic acid, maleic acid, maleic acid anhydrate, fumaric acid, itaconic acid, itaconic acid anhydrate, citraconic acid, citraconic acid anhydrate and a combination thereof. Preferably, the first unsaturated monomer (a-1) is selected from the group consisting of acrylic acid, methacrylic acid, 2-methyl-acryloyl ethoxy acid esters and a combination thereof.

Based on the mixture as 100 parts by weight, the amount of the first unsaturated monomer (a-1) is 5 to 50 parts by weight, preferably 8 to 45 parts by weight, and more preferably 10 to 40 parts by weight. When the amount of the first unsaturated monomer is 5 to 50 parts by weight, the photosensitive resin composition has a better developing ability while photolithography process, such as exposing and developing, is performed.

The second unsaturated monomer (a-2) is selected from the group consisting of an unsaturated compound containing dicyclopentanyl group, a unsaturated compound containing dicyclopentenyl group and a combination thereof.

More specifically, the second unsaturated monomer (a-2) could be dicyclopentyl acrylate, dicyclopentyl ethoxy acrylate, dicyclopentenyl acrylate, dicyclopentenyl ethoxy acrylate, dicyclopentyl methacrylate, dicyclopentyl ethoxy methacrylate, dicyclopentenyl methacrylate, dicyclopentenyl ethoxy methacrylate and a combination thereof.

Based on the mixture as 100 parts by weight, the amount of the second unsaturated monomer (a-2) is 1 to 20 parts by weight, preferably 3 to 18 parts by weight, and more preferably is 5 to 15 parts by weight. When the amount of the second unsaturated monomer (a-2) is 2 to 20 parts by weight, the pixel color layer formed by the photosensitive resin composition has a better heat resistance after the photolithography process.

The third unsaturated monomer (a-3) is selected from the group consisting of styrene, α-methyl styrene, vinyl toluene, chloro styrene, divinyl benzene, benzyl methacrylate, benzyl acrylate, phenyl methacrylate, phenyl acrylate, 2-nitrophenyl acrylate, 4-nitrophenyl acrylate, 2-nitrobenzyl acrylate, 2-nitrobenzyl methacrylate, 2-nitrophenyl methacrylate, 2-chlorophenyl methacrylate, 4-chlorophenyl methacrylate, 2-chlorophenyl acrylate, 4-chlorophenyl acrylate, phenoxy-ethyl methacrylate, phenoxy polyethylene glycol acrylate, phenoxy polyethylene glycol methacrylate, nonyl phenoxy polyethylene glycol acrylate, nonyl phenoxy polyethylene glycol methacrylate, N-phenyl maleimide, N-o-hydroxyphenyl maleimide, N-m-hydroxyphenyl maleimide, N-p-hydroxyphenyl maleimide, N-o-methoxyl phenyl maleimide, N-m-methyl phenyl maleimide, N-p-methyl phenyl maleimide, N-o-methoxyl phenyl maleimide, N-m-methoxyl phenyl maleimide, N-p-methoxyl phenyl maleimide, o-vinyl phenol, m-vinyl phenol, p-vinyl phenol, 2-methyl-4-vinyl phenol, 3-methyl-4-vinyl phenol, o-isopropenyl phenol, m-isopropenyl phenol, p-isopropenyl phenol, 2-vinyl-1-naphthol, 3-vinyl-1-naphthol, 1-vinyl-2-naphthol, 3-vinyl-2-naphthol, 2-isopropenyl-1-naphthol, 3-isopropenyl-1-naphthol, o-methoxy styrene, m-ethoxy styrene, p-methoxy styrene, o-methoxy methyl styrene, m-methoxy methyl styrene, p-methoxy methyl styrene, o-(vinyl benzyl)epoxypropyl ether, m-(vinyl benzyl)epoxypropyl ether, p-(vinyl benzyl) epoxypropyl ether, indene, acetyl naphthalene, N-cyclohexyl maleimide, methyl acrylate, ethyl acrylate, n-propyl acrylate, isopropyl acrylate, n-butyl acrylate, isobutyl acrylate, sec-butyl acrylate, test-butyl acrylate, 2-hydroxyethyl acrylate, 2-hydroxypropyl acrylate, 3-hydroxypropyl acylate, 2-hydroxybutyl acrylate, 3-hydroxybut acrylate, 4-hydroxybutyl acrylate, allyl acrylate, triethylene glycol dimethoxy acrylate, N,N-dimethyl amino ethyl acrylate, N,N-diethyl amino propyl acrylate, N,N-dibutyl amino propyl acrylate, epoxypropylacrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, allyl methacrylate, triethylene glycol methoxyl dimethacrylate, dodecy 2-methacrylate, myristyl methacrylate, cetyl methacrylate, octadecyl methacrylate, eicosyl methacrylate, behenyl methacrylate, N,N-dimethyl amino ethyl methacrylate, N,N-dimethyl amino propyl methacrylate, N-isobutyl amino ethyl methacrylate, epoxy propyl methacrylate, vinyl acetate, vinyl propionate, vinyl butyrate, methoxyethene, ethoxyethene, allyl glycidyl ether, methallyl glycidyl ether, acrylonitrile, methacrylonitrile, α-chloro acrylonitrile, vinylidene cyanide, acrylamide, methacrylamide, α-chloro acrylamide, N-hydroxyethyl acrylamide, N-hydroxyethyl methacrylamide, 1,3-butadiene, isoamylene, chloroprene and a combination thereof. Preferably, the third unsaturated monomer (a-3) is styrene, α-methyl styrene, phenyl methacrylate, phenyl acrylate, N-phenyl maleimide, N-o-hydroxy phenyl maleimide, N-m-hydroxy phenyl maleimide, N-p-hydroxy phenyl maleimide, methyl acrylate, ethyl acrylate, n-propyl acrylate, isopropyl acrylate, n-butyl acrylate, isobutyl acrylate, sec-butyl acrylate, tert-butyl acrylate, 2-hydroxyethyl acrylate, 2-hydroxypropyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate, 2-hydroxyethyl methacrylate, 2-hydroxypropyl methacrylate, epoxypropyl methacrylate, vinyl acetate, acrylonitrile, methyl acrylonitrile, 1,3-butadiene, isoamylene and a combination thereof.

Based on the mixture as 100 parts by weight, the amount of the third unsaturated monomer (a-3) is 30 to 94 parts by weight, preferably 37 to 89 parts by weight, and more preferably 45 to 85 parts by weight. When the amount of the third unsaturated monomer (a-3) is 30 to 94 parts by weight, the pixel color layer formed by the photosensitive resin composition has a better anti-sputtering ability.

A Compound (B) Containing Vinyl Unsaturated Group(s)

The compound (B) containing vinyl unsaturated group(s) of the present invention is selected from the group consisting of a first compound (B-1), a second compound (B-2) and a combination thereof.

The first compound (B-1) is a (meth)acrylic ester compound synthesized from a caprolactone-modified polyol, a (meth)acrylic acid and a combination thereof.

The caprolactone-modified polyol is synthesized from a caprolactone and a polyol with at least four functional groups. The aforementioned caprolactone could be γ-caprolactone, δ-caprolactone, or ε-caprolactone. Preferably, the caprolactone is ε-caprolactone. The polyol with at least four functional groups could be pentaerythritol, ditrimethylolpropane and dipentaerythritol. Preferably, based on the polyol with at least four functional groups as 1 mole, the amount of the caprolactone is 1 to 12 mole.

The first compound (B-1) is selected from the group consisting of pentaerythritol caprolactone modified tetra (meth)acrylate compound, di(trimethylolpropane) caprolactone modified tetra(meth)acrylate compound, dipentaerythritol caprolactone modified poly(meth)acrylate compound and a combination thereof. Moreover, the dipentaerythritol caprolactone modified poly(meth)acrylate compound can be dipentaerythritol caprolactone modified di(meth)acrylate compound, dipentaerythritol caprolactone modified tri (meth)acrylate compound, dipentaerythritol caprolactone modified tetra(meth)acrylate compound, dipentaerythritol caprolactone modified penta(meth)acrylate compound, dipentaerythritol caprolactone modified hexa(meth)acrylate compound and a combination thereof.

Furthermore, the aforementioned first compound (B-1) has a structure of the formula (I):

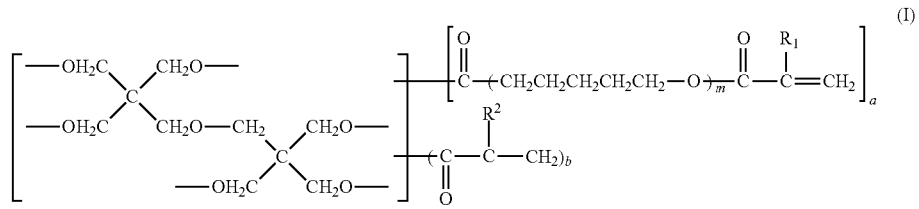

In formula (I), $R_1$ and $R_2$ respectively is a hydrogen atom or a methyl group, m is an integer of 1 to 2, a is an integer of 1 to 6, b is an integer of 0 to 5, wherein (a+b) is an integer of 2 to 6, preferably 3 to 6, more preferably 5 to 6, and yet more preferably is 6.

More specifically, the first compound (B-1) is a product made by Nippon Kayak Co., Ltd., and the trade name is KAYARAD®DPCA-20, DPCA-30, DPCA-60, or DPCA-120.

Based on the alkali-soluble resin as 100 parts by weight, the amount of the first compound is 5 to 100 parts by weight, preferably 8 to 90 parts by weight, more preferably 10 to 80 parts by weight. The caprolactone in the first compound (B-1) could dismiss the defects of bubble-displaying. When the compound (B) containing vinyl unsaturated group(s) do not include the first compound (B-1), the developing ability is worse.

The second compound (B-2) comprising a functional group of the formula (II):

In the formula (II), $R_3$ is a hydrogen atom or a methyl group.

The second compound (B-2) is selected from acrylamide, (meth)acrylate morpholine, 7-amino-3,7-dimethyloctyl (meth)acrylate, isobutoxy methyl(meth)acrylamide, isobornyl ethoxy(meth)acrylate, isobornyl(meth)acrylate, 2-ethylhexyl(meth)acrylate, ethylene diglycol(meth)acrylate, tert-octyl(meth)acrylamide, diacetone(meth)acrylat, dimethyl amino(meth)acrylate, dosecyl(meth)acrylate, dicyclopentenyl ethoxy(meth)acrylate, dicyclopentenyl(meth)acrylate, N,N-dimethyl(meth)acrylamide, tetrachloro phenyl(meth)acrylate, 2-tetrachloro phenoxy ethyl(meth)acrylate, tetrahydrofurfuryl(meth)acrylate, tetrabromo phenyl(meth)acrylate, 2-tetrabromo phenoxy ethyl(meth)acrylate, 2-trichloro phenoxy ethyl(meth)acrylate, tribromo phenyl(meth)acrylate, 2-tribromo phenoxy ethyl(meth)acrylate, 2-hydroxy ethyl(meth)acrylate, 2-hydroxy propyl(meth)acrylate, vinyl vaprolactam, N-ethylene pyrrolidone carboxylate, phenoxy ethyl(meth)acrylate, pentachloro phenyl(meth)acrylate, pentabromo phenyl(meth)acrylate, polyethylene glycol mono(meth)acrylate, polypropylene glycol mono(meth)acrylate, bornyl(meth)acrylate, diethylene glycol di(meth)acrylate, dicyclopentenyl di(meth)acrylate, triethylene glycol di(meth)acrylate, tetraethylene glycol di(meth)acrylate, tri(2-hydroxyethylene)isocyanate di(meth)acrylate, tri(2-hydroxyethylene)isocyanate tri(meth)acrylate, caprolactone modified tri(2-hydroxyethylene)isocyanate tri(meth)acrylate, trihydroxymethylene tri(meth)acrylate, ethylene oxide (hereinafter abbreviated as EO) modified trihydroxymethylene tri(meth)acrylate, propylene oxide (hereinafter abbreviated as PO) modified trihydroxymethylene tri(meth)acrylate, dineopentyl glycol di(meth)acrylate, 1,4-butanediol di(meth)acrylate, 1,6-hexanediol di(meth)acrylate, pentaerythrite tri(meth)acrylate, pentaerythrite tetra(meth)acrylate, polyester di(meth)acrylate, polyethylene glycol di(meth)acrylate, dipentaerythrite hexa(meth)acrylate, dipentaerythrite penta(meth)acrylate (a product made by Nippon Toagosei Co., Ltd., and the trade name is TO-1382), dipentaerythrite tetra(meth)acrylate, caprolactone modified dipentaerythrite hexa(meth)acrylate, EO modified dipentaerythrite hexaacrylate, caprolactone modified dipentaerythrite penta(meth)acrylate, di(trihydroxymethylene)tetra(meth)acrylate, EO modified bisphenol A di(meth)acrylate, PO modified bisphenol A di(meth)acrylate, EO modified hydrogenated bisphenol A di(meth)acrylate, PO modified hydrogenated bisphenol A di(meth)acrylate, PO modified tripropionin, EO modified hydrogenated isophenol F di(meth)acrylate, phenolic polyglycerols (meth)acrylate, trimethylolpropane triacrylate, EO modified trimethylolpropane triacrylate, PO modified trimethylolpropane triacrylate, pentaerythritol triacrylate, pentaerythritol tetraacrylate, dipentaerythritol hexaacrylate, dipentaerythritol pentaacrylate, dipentaerythritol tetraacrylate, caprolactone modified dipentaerythritol hexaacrylate, di(trihydroxymethylene)tetraacrylate and a combination thereof.

Preferably, the second compound (B-2) is selected from trimethylolpropane triacrylate, EO modified trimethylolpropane triacrylate, PO modified trimethylolpropane triacrylate, pentaerythritol triacrylate, pentaerythritol tetraacrylate, dipentaerythritol hexaacrylate, dipentaerythritol pentaacrylate, dipentaerythritol tetraacrylate, caprolactone modified dipentaerythritol hexaacrylate, di(trihydroxymethylene)tetraacrylate, PO modified tripropionin, a product made by Nippon Toagosei Co., Ltd., and the trade name is TO-1382, and a combination thereof.

Based on the alkali-soluble resin (A) as 100 parts by weight, the amount of the second compound (B-2) is 5 to 400 parts by weight, preferably 8 to 350 parts by weight, and more preferably 10 to 300 parts by weight, so as to improve the developing ability of the photosensitive resin composition.

Based on the alkali-soluble resin (A) as 100 parts by weight, the amount of the compound (B) containing vinyl unsaturated group(s) is 10 to 500 parts by weight, preferably 20 to 450 parts by weight, more preferably 30 to 400 parts by weight, so as to improve the developing ability of the photosensitive resin composition.

Photo Initiator (C)

The photo initiator (C) is selected from the group consisting of acetophenone, biimidazole, acyl oxime and a combination thereof.

The aforementioned acetophenone is selected from the group consisting of p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthiophenyl)-2-morpholino-1-propanone, 2-benzyl-2-N,N-dimethylamino-1-(4-morpholinophenyl)-1-butanone and a combination thereof.

The aforementioned biimidazole is selected from the group consisting of 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methylphenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, 2,2'-bis(2,4-dichlorophenyl)-4,4',5,5'-tetraphenyl-biimidazole and a combination thereof.

The aforementioned acyl oxime is selected from the group consisting of {Ethanone, 1-[9-ethyl-6-(2-methylbenzoyl)-9H-carbazole-3-yl]-, 1-(O-acetyl oxime)} [for example, the product made by Ciba Specialty Chemicals Co., Ltd., and the trade name is CGI-242 which comprises a structure of the formula (III)], 1-[4-(benzoyl)phenyl]-heptane-1,2-dione 2-(O-benzoyloxime) [for example, the product made by Ciba Specialty Chemicals Co., Ltd., and the trade name is CGI-124 which comprises a structure of the formula (IV)], {Ethanone, 1-[9-ethyl-6-(2-chloro-4-benzyl-thio-benzoyl)-9H-carbazole-3-yl]-, 1-(O-acetyl oxime)} [for example, the product made by Adeka Corporation, and the product comprises a structure of the formula (V)]:

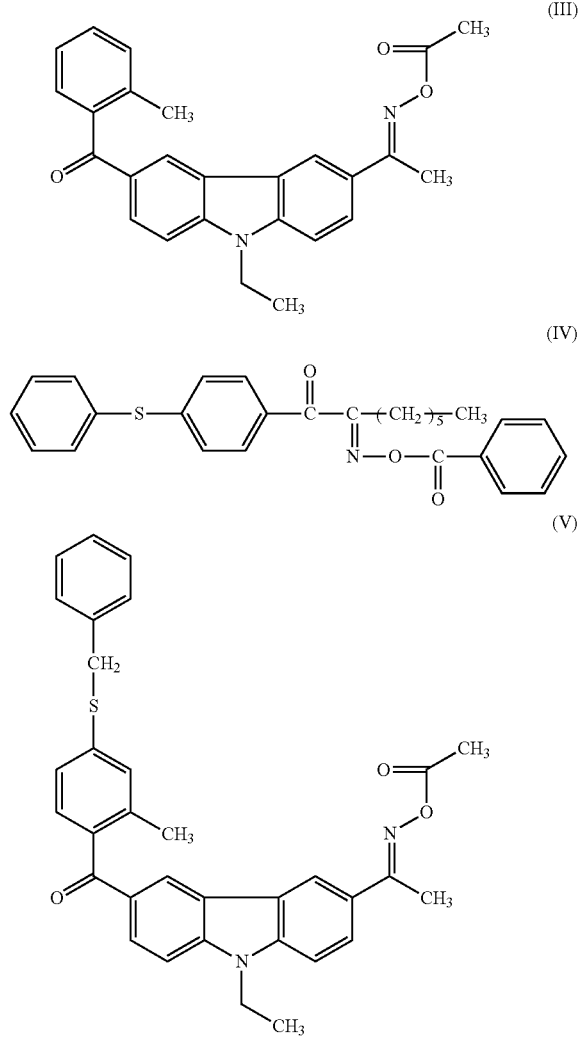

Preferably, the photo initiator (C) is selected from the group consisting of 2-methyl-1-(4-methylthiophenyl)-2-morpholine-1-propanone, 2-benzyl-2-N,N-dimethylamino-1-(4-morpholinophenyl)-1-butanone, 2,2'-bis(o-chlorophenyl)-4,4',5,5'-tetraphenyl-biimidazole, [Ethanone, 1-[9-ethyl-6-(2-methylbenzoyl)-9H-carbazole-3-yl]-, 1-(O-acetyl oxime)] and a combination thereof.

The photo initiator (C) of the present invention further comprises: benzophenone such as thioxanthone, 2,4-diethyl-thioxanthanone, thioxanthone-4-sulfone, benzophenone, 4,4'-bis(dimethylamino)benzophenone, 4,4'-bis(diethylamino)benzophenone and the like; α-diketone such as benzil, acetyl and the like; acyloin such as benzoin and the like; acyloin ether such as benzoin methylether, benzoin ethylether, benzoin isopropyl ether and the like; acyphosphineoxide such as 2,4,6-trimethyl-benzoyl-diphenyl-phosphineoxide, bis-(2,6-dimethoxy-benzoyl)-2,4,4-trimethyl-benzyl-phosphoneoxide and the like; quinone such as anthraquinone, 1,4-naphthoquinone and the like; tris(trichloromethyl)-s-triazine such as phenacyl chloride, tribromomethyl-phenylsulfone and the like; peroxide compound such as di-tertbutylperoxide and the like. Among those photo initiator (C), benzophenone is preferred, and 4,4'-bis(diethylamino)benzophenone is more preferred.

Based on the alkali-soluble resin (A) as 100 parts by weight, the amount of the photo initiator (C) is 2 to 100 parts by weight, preferably 3 to 175 parts by weight, and more preferably 5 to 150 parts by weight.

Organic Solvent (D)

The organic solvent (D) can soluble the alkali-soluble resin (A), the compound (B) containing vinyl unsaturated group(s), and the photo initiator (C), and the organic solvent (D) does not react with the aforementioned compounds. Moreover, the organic solvent has a suitable volatility.

The organic solvent (D) can be (poly)alkylene glycol monoalkylether such as ethylene glycol monomethylether, ethylene glycol monoethylether, diethylene glycol monomethylether, diethylene glycol monoethylether, diethylene glycol n-propylether, diethylene glycol n-butylether, triethylene glycol monomethylether, triethylene glycol monoethylether, propylene glycol monomethylether, propylene glycol monoethylether, dipropylene glycol monomethylether, dipropylene glycol monoethylether, dipropylene glycol n-propylether, dipropylene glycol n-butylether, tripropylene glycol monomethylether, tripropylene glycol monoethylether and the like; (poly)alkylene glycol monoalkylether acetate such as ethylene glycol monomethylether acetate, ethylene glycol monoethylether acetate, propylene glycol monomethylether acetate, propylene glycol monoethylether acetate and the like; ether such as diethylene glycol dimethyl ether, diethylene glycol ethyl methyl ether, diethylene glycol diethyl ether, tetrahydrofuran and the like; ketone such as methyl ethyl ketone, cyclohexanone, 2-heptanone, 3-heptanone and the like; lactic alkoxycarbonyl such as methyl 3-hydroxypropanoate, ethyl 2-hydroxypropanoate and the like; ester such as methyl 2-hydroxy-2-methylpropionate, ethyl 2-hydroxy-2-methylpropionate, methyl 3-methoxypropionate, ethyl 3-methoxypropionate, methyl 3-ethoxypropionate, ethyl 3-ethoxypropionate, ethoxy ethyl acetate, hydroxy ethyl acetate, methyl 2-hydroxy-3-methylbutyrate, 3-methyl-3-methoxybutyl acetate, 3-methyl-3-methoxybutyl acrylic acid, ethyl acetate, n-butyl acetate, n-propyl acetate, isopropyl acetate, isobutyl acetate, n-pentyl acetate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, 2-oxide-butyric acid ethyl ester and the like; aromatic hydrocarbons such as toluene, dimethylbenzene and the like; carboxylic acid amide such as N-methyl-pyrrolidinone, N,N-dimethyl formamide, N,N-dimethyl acetamide and the like.

Preferably, the organic solvent (D) can be propylene glycol monomethylether acetate, ethyl 3-ethoxypropionate or can be used in combination of two or more.

Based on the alkali-soluble resin (A) as 100 parts by weight, the amount of the organic solvent (D) is 500 to 5000 parts by weight, preferably 800 to 4000 parts by weight.

Pigment (E)

The pigment (E) can be an inorganic pigment, an organic pigment and a combination thereof.

The aforementioned inorganic pigment is metallic compound such as metallic oxide compound, metallic complex salt and the like. The inorganic pigment is selected from metallic oxide compound and complex oxide compound containing iron, cobalt, aluminum, cadmium, lead, copper, titanium, magnesium, chromium, zinc, antimony and the like.

The aforementioned organic pigment is selected from C.I. pigment yellow 1, 3, 11, 12, 13, 14, 15, 16, 17, 20, 24, 31, 53, 55, 60, 61, 65, 71, 73, 74, 81, 83, 93, 95, 97, 98, 99, 100, 101, 104, 106, 108, 109, 110, 113, 114, 116, 117, 119, 120, 126, 127, 128, 129, 138, 139, 150, 151, 152, 153, 154, 155, 156, 166, 167, 168, 175; C.I. pigment orange 1, 5, 13, 14, 16, 17, 24, 34, 36, 38, 40, 43, 46, 49, 51, 61, 63, 64, 71, 73; C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, 265; C.I. pigment purple 1, 19, 23, 29, 32, 36, 38, 39; C.I. pigment blue 1, 2, 15, 15:3, 15:4, 15:6, 16, 22, 60, 66; C.I. pigment green 7, 36, 37; C.I. pigment brown 23, 25, 28; and C.I. pigment black 1, 7.

An average particle size of primary particle in the pigment (E) is 10 to 200 nm, preferably 20 to 150 nm, more preferably 30 to 130 nm.

Based on the alkali-soluble resin (A) as 100 parts by weight, the amount of the pigment (E) is 100 to 800 parts by weight, preferably 120 to 750 parts by weight, more preferably 150 to 700 parts by weight.

Alternatively, the pigment (E) selectively comprises a dispersing agent, for example surfactant such as cationic surfactant, ionic surfactant, nonionic surfactant, amphoteric surfactant, polysiloxane surfactant, fluorine surfactant and the like.

The aforementioned surfactant can be used alone or in combination of two or more selected from follows: polyoxyethylene alkyl ether such as polyoxyethylene lauryl ether, polyoxyethylene stearyl ether amide, polyoxyethylene oleyl ether and the like; polyoxyethylene alkyl ether surfactant such as polyoxyethylene octyl phenyl ether, polyoxyethylene nonyl phenyl ether and the like; polyethylene glycol diester such as polyethylene glycol bislaurate, polyoxyethylene stearate and the like; sorbitan fatty acid ester surfactant; fatty acid modified polyester surfactant; tertiary amines modified polyurethane surfactant; a product made by Shin-Etsu Chemical Co., Ltd., and the trade name is KP; a product made by Toray Dow Corning Silicon Co., Ltd., and the trade name is SF-8427; a product made by Kyoeisha Chemical Co., Ltd., and the trade name is Polyflow; a product made by Tochem Products Co., Ltd., and the trade name is F-Top; a product made by Dainippon Ink and Chemicals Co., Ltd., and the trade name is Megafac; a product made by Sumitomo 3M Co., Ltd., and the trade name is Fluorade; a produce made by Asahi Glass Co., Ltd., and the trade name is Asahi Guard or Surflon.

Metal Chelating Agent (F)

The metal chelating agent (F) comprises a structure of the formula (VI):

$(R_4)_p M(OR_5)_{j-p}$ (VI)

In the formula (VI), M is metal, $R_4$ is a ligand group, $R_5$ is an alkyl group of 2 to 5 carbons or an aryl group of 6 to 20 carbons, p is an integer of 1 to j, and j is a values of metal. When the numbers of $R_4$ or $R_5$ are two or more, every $R_4$ or $R_5$ can be the same or be different.

The alkyl group of 2 to 5 carbons can include but are not be limited ethyl group, propyl group, isopropyl group, or butyl group. The aryl group of 6 to 20 carbons includes but are not be limited benzene.

The metal includes but is not limited aluminum, titanium, zirconium, beryllium, calcium, cobalt, copper, iron, hafnium, iridium, palladium, manganese, molybdenum, niobium, nickel, platinum, tin, ruthenium, tantalum, vanadium, tungsten, or zinc, preferably is selected from aluminum, titanium, or zirconium.

Preferably, the ligand group is selected from the group consisting of β-diketones chelating group, β-ketoester chelating group, amino chelating group, sulfonic acid chelating group, or phosphoric acid chelating group.

The β-diketones chelating group includes but is not limited acetylacetonate, 2,2,6,6-tetramethyl-3,5-heptanedionate, benzoyl acetonate, 1,3-diphenyl-1,3-propanedionate, tetramethylheptanedionate, hexanedionate, or heptanedionate.

The β-ketoester chelating group includes but is not limited ethyl acetoacetate, methyl acetoacetate, benzoyl acetoacetate, methacryloxy ethyl acetate, allyl acetoacetate, methyl benzoyl acetate, ethyl benzoyl acetate, or benzoyl acetate.

The amino chelating group includes but is not limited N-aminoethyl aminoethyl.

The sulfonic acid chelating group includes but is not limited dodecylbenzenesulfonic acid.

The phosphoric acid chelating group includes but is not limited dioctyl pyrophosphate, dioctyl phosphate, or tridecyl phosphate.

The metal chelating agent (F) can be used alone or in combination of two or more. The metal chelating agent (F) includes but is not limited aluminum chelate compound such as tris(acetylacetonato)aluminum, tris(ethyl acetoacetate) aluminum, (di-i-propoxy)monoacetylacetonato aluminum, (di-i-propoxy)monomethylacetoacetato aluminum, (d-i-propoxy)monoethylacetoacetate aluminum, bis(ethyl acetoacetato)monoacetylacetonato aluminum and the like; titanium chelate compound such as triethoxy monoacetylacetonato titanium, tri-n-propoxy monoacetylacetonato titanium, tri-i-propoxy monoacetylacetonato titanium, di-i-propoxy bisacetylacetonate titanium, di-i-propoxy bis(ethyl acetoacetato)titanium, tri-n-butoxy monoacetylacetonato titanium, tri-sec-butoxy monoacetylacetonato titanium, tri-t-butoxy monoacetylacetonato titanium, diethoxy bisacetylacetonato titanium, di-n-propoxy bisacetylacetonato titanium, di-i-propoxy bisacetylacetonato titanium, di-n-butoxy bisacetylacetonato titanium, di-sec-butoxy bisacetylacetonato titanium, di-t-butoxy bisacetylacetonato titanium, monoethoxy trisacetylacetonato titanium, mono-n-propoxy trisacetylacetonato titanium, mono-i-propoxy trisacetylacetonato titanium, mono-n-butoxy trisacetylacetonato titanium, mono-sec-butoxy trisacetylacetonato titanium, mono-t-butoxy trisacetylacetonato titanium, tetrakis (acetylacetonato)titanium, triethoxy monoethyl acetoacetato titanium, tri-n-propoxy monoethyl acetoacetato titanium, tri-i-propoxy monoethyl acetoacetato titanium, tri-n-butoxy monoethyl acetoacetato titanium, tri-sec-butoxy monoethyl acetoacetato titanium, tri-t-butoxy monoethyl acetoacetato titanium, diethoxy bisethyl acetoacetato titanium, di-n-propoxy bisethyl acetoacetato titanium, di-i-propoxy bisethyl acetoacetato titanium, di-n-butoxy bisethyl acetoacetato titanium, di-sec-butoxy bisethyl acetoacetato titanium, di-t-butoxy bisethyl acetoacetato titanium, monoethoxy trisethyl acetoacetato titanium, mono-n-propoxy trisethyl acetoacetato titanium, mono-i-propoxy trisethyl acetoacetato titanium, mono-n-butoxy trisethyl acetoacetato titanium, mono-sec-butoxy trisethyl acetoacetato titanium, mono-t-butoxy trisethyl acetoacetato titanium, tetrakisethyl acetoacetato titanium, mono acetylacetonato trisethyl acetoacetate titanium, bisacetylacetonate bisethyl acetoacetato titanium, trisacetylacetonato monoethyl acetoacetate titanium, di-n-propoxy bis(triethanolamine)titanium, di-n-butoxy bis(triethanolamine)titanium, isopropyl tris(dodecylbenzenesulfonyl)titanium, isopropyl tris(dodecylbenzenesulfonyl)titanate, isopropyl tris(dioctyl pyrophosphate) titanate, tetraisopropyl bis(dioctyl phosphate)titanate, tetraoctyl bis(di-tridecyl phosphate)titanate, tetra(2,2-diallyloxymethyl-1-butyl)bis(di-tridecyl)phosphate titanate, bis (dioctyl pyrophosphate)oxyacetate titanate, bis(di-octyl pyrophosphate)ethylene titanate, isopropyl tri(dioctyl phosphate)titanate, isopropyl tri(N-aminoethyl aminoethyl)titanate and the like; zirconium chelate compound such as triethoxy monoacetylacetonato zirconium, tri-n-propoxy monoacetylacetonato zirconium, tri-i-propoxy monoacetylacetonato zirconium, tri-n-butoxy monoacetylacetonato zirconium, tri-sec-butoxy monoacetylacetonato zirconium, tri-t-butoxy monoacetylacetonato zirconium, diethoxy bisacetylacetonato zirconium di-n-propoxy bisacetylacetonato zirconium, di-i-propoxy bisacetylacetonato zirconium, di-n-butoxy bisacetylacetonato zirconium, di-sec-butoxy bisacetylacetonato zirconium, di-t-butoxy bisacetylacetonato zirconium, monoethoxy trisacetylacetonato zirconium, mono-n-propoxy trisacetylacetonato zirconium, mono-i-propoxy tris acetylacetonato zirconium, mono-n-butoxy trisacetylacetonato zirconium, mono-sec-butoxy trisacetylacetonato zirconium, mono-t-butoxy trisacetylacetonato zirconium, tetrakisacetylacetonato zirconium, triethoxy monoethyl acetoacetato zirconium, tri-n-propoxy monoethyl acetoacetato zirconium, tri-i-propoxy monoethyl acetoacetato zirconium, tri-n-butoxy monoethyl acetoacetato zirconium, tri-sec-butoxy monoethyl acetoacetato zirconium, tri-t-butoxy monoethyl acetoacetato zirconium, diethoxy bisethyl acetoacetato zirconium, di-n-propoxy bisethyl acetoacetato zirconium, di-i-propoxy bisethyl acetoacetato zirconium, di-n-butoxy bisethyl acetoacetato zirconium, di-sec-butoxy bisethyl acetoacetato zirconium, di-t-butoxy-bisethyl acetoacetato zirconium, monoethoxy trisethyl acetoacetato zirconium, mono-n-propoxy trisethyl acetoacetato zirconium, mono-i-propoxy trisethyl acetoacetato zirconium, mono-n-butoxy trisethyl acetoacetato zirconium, mono-sec-butoxy trisethyl acetoacetato)zirconium, mono-t-butoxy-trisethyl acetoacetato zirconium, tetrakisethyl acetoacetato zirconium, monoacetylacetonate trisethyl acetoacetato zirconium, bisacetylacetonate bisethyl acetoacetato zirconium, trisacetylacetonato monoethyl acetoacetate zirconium and the like.

Based on the alkali-soluble resin (A) as 100 parts by weight, the amount of the metal chelating agent (F) is 1 to 50 parts by weight, preferably 2 to 45 parts by weight, more preferably 3 to 40 parts by weight.

When the photosensitive resin composition does not comprise the metal chelating agent (F), the adhesiveness between the substrate and the pixel formed by the photosensitive resin composition is worse in the process for fabricating pixels, wherein the process does not comprise a pre-baking step.

As the amount of the metal chelating agent (F) is excess, the developing ability of the photosensitive resin composition is worse. In the situation, the first compound (B-1) is simultaneously added as the compound (B) containing vinyl unsaturated group(s), the first compound (B-1) can dissolve the defect of the developing ability.

Preparation of Photosensitive Resin Composition for Color Filter

In general, the photosensitive resin composition of the present invention is prepared by mixing the aforementioned alkali-soluble resin (A), the compound (B) containing vinyl unsaturated group(s), the photo initiator (C), the organic solvent (D), the pigment (E), and the metal chelating agent (F) in a conventional mixer uniformly until all compositions are formed into a solution state, optionally adding a filling, agent, an antioxidant, a UV-absorption agent, an anti-agglutinating agent, a surfactant and the like thereto if necessary, so as to obtain the photosensitive resin composition.

Forming Method for Pixel Color Layer of Color Filter

The color filter of the present invention comprises a pixel color layer formed by the photosensitive resin composition treated by a photolithography process.

When the pixel color layer is formed, the aforementioned solution state of the photosensitive resin composition can be coated on a substrate by various coating method, for example, spin-coating, cast coating or roll coating and the like. The substrate can include but is not limited to alkali-free glass, Na—Ca glass, hard glass (Pyrex glass), a quartz glass or those having an electrically conductive transparent film disposed thereon; a substrate of light-to-electricity conversion (for example, silicone substrate) utilized in solid-camera device and the like. Before the photosensitive resin composition is coated on the substrate, the black matrixes for separating the pixel color layer of red, green, blue and the like have been formed on the substrate.

After coating process, the organic solvent in the coated photosensitive resin composition is removed by drying process under reduced pressure. The drying process under reduced pressure is carried out in various conditions, for example, the drying process under reduced pressure is performed under 0 to 200 mmHg for 1 to 60 seconds, which depend upon the kinds and the mixing ratio of the compounds.

After the drying process under reduced pressure, the coated film is exposed under a mask having specific patterns. The exposure light is preferably UV light such as g-line, h-line, l-line and so on, which may be generated by a UV illumination device such as (super) high-pressure mercury lamp or metal halide lamp.

After exposing process, the coated film is immersed in a developing solution at 23±2° C. for 15 seconds to 5 minutes, thereby remove undesired areas and forming a given pattern. The developing solution includes but not limited to alkaline compounds such as sodium hydroxide, potassium hydroxide, sodium carbonate, sodium silicate, sodium methyl silicate, ammonia solution, ethylamine, diethylamine, dimethylethylanolamine, tetramethylammonium hydroxide, tetraethylammonium hydroxide, choline, pyrrole, piperidine, 1,8-diazabicyclo-[5,4,0]-7-undecene and the like. The concentration of the developing solution is 0.001 weight percent (wt %) to 10 wt % preferably 0.005 wt % to 5 wt %, and more preferably 0.01 wt % to 1 wt %.

Thereafter, the patterns on the substrate are washed by water, and then dried by using compressed air or nitrogen gas. Then, the patterns are subjected to a post-bake process with heating device such as a hot plate or an oven. The post-bake process can be carried out at 150° C. to 250° C. for 5 to 60 minutes on the hot plate or for 15 to 150 minutes in the oven, thereby curing the patterns and forming a pixel color layer.

The pixel color layers such as red, green, blue and the like can be formed on the substrate by repeating the aforementioned steps.

Method of Producing Color Filter

An ITO protective film is sputtered on the surface of the pixel color layer at 220° C. to 250° C. under vacuum environment. The ITO protective film is etched and patterned if necessary, and then an alignment film is applied on the surface of the ITO protective film, so as to produce the color filter of the present invention.

Method of Producing Liquid Crystal Display Device

The liquid crystal display device, for example liquid crystal panel, comprises the aforementioned color filter. A glass substrate which have been inlaid thin film transistor (TFT) and been applied an alignment film is oppositely disposed the aforementioned color filter, and the spacers are disposed between the glass substrate and the color filter.

Next, the liquid crystal molecule is injected into the spacer. And then, polarized plates are respectively adhered on the outer surface of the color filter and the glass substrate, so as to produce the liquid crystal display device.

Several embodiments are described below to illustrate the application of the present invention. However, these embodiments are not used for limiting the present invention. For those skilled in the art of the present invention, various variations and modifications can be made without departing from the spirit and scope of the present invention.

DETAILED DESCRIPTION

Preparation of Alkali-Soluble Resin (A)

Hereinafter, the alkali-soluble resin (A) of Synthesis Examples A-1 to A-6 were prepared according to Table 1 as follows.

Synthesis Example A-1

A 1000 mL four-necked conical flask equipped with a nitrogen inlet, a stirrer, a heater, a condenser and a thermometer was purged with nitrogen gas. According to table 1, the kinds and the mixing ratio of the components were prepared to synthesis the alkali-soluble resin (A). The aforementioned components comprised the first unsaturated monomer, the second unsaturated monomer, the third unsaturated monomer, the polymerized initiator and the solvent.

During polymerization is performed, 5 parts by weight of 2-methacryloyloxyethyl succinate monoester (HOMS), 5 parts by weight of dicyclopentenyl acrylate (FA-511A), 40 parts by weight of styrene monomer (SM) and 50 parts by weight of methyl methacrylate (MMA) were firstly added into the four-necked conical flask and stirred to form a solution state. Simultaneously, the oil bath temperature of the four-necked conical flask was elevated to 100° C. Furthermore, 6 parts by weight of 2,2'-azobis-2-methyl butyronitrile (AMBN) was dissolved in 200 parts by weight of ethyl 3-ethoxypropionate (EEP), and the solution containing AMBN was separated to five equal parts. One of the five parts was added into the four-necked conical flask every one hour. The reaction temperature of the polymerization process was kept 100° C., and the polymerization time was continued for 6 hrs. After the polymerization process, the polymerized product was taken out, and the solvent was volatilized, so as to produce the alkali-soluble resin (A).

Synthesis Examples A-2 to A-6

Synthesis Examples A-2 to A-6 were synthesized with the same method as in Synthesis Example A-1 by using various kinds or amounts of the reactants for the alkali-soluble resin (A). The formulations of Synthesis Examples A-2 to A-6 were listed in Table 1 rather than focusing or mentioning them in details.

Preparation of Photosensitive Resin Composition for Color Filter

The photosensitive resin compositions of Examples 1 to 7 and Comparative Examples 1 to 4 were prepared according to Table 2 as follows.

Example 1

100 parts by weight of the alkali-soluble resin (A-1), 5 parts by weight of DPCA-120 made by Nippon Kayaku Co., Ltd. (hereinafter abbreviated as B-1-1), 200 parts by weight of Dipentaerythritol hexaacrylate (DPHA; hereinafter abbreviated as B-2-1), 3 parts by weight of 2-methyl-1-(4-methylthiophenyl)-2-morpholino-1-propanone (hereinafter abbreviated as C-1), 5 parts by weight of 2,2'-bis(2,4-dichlorophenyl)-4,4',5,5'-tetraphenyl-biimidazole (hereinafter abbreviated as C-2), 150 parts by weight of C. I. Pigment R254/C. I. Pigment Y139=80/20 (hereinafter abbreviated as E-1), and 1 part by weight of tris(ethyl acetoacetato)aluminum (hereinafter abbreviated as F-1) were added into 1000 parts by weight of Propylene glycol monomethyl ether acetate (hereinafter abbreviated as D-1). The aforementioned components was mixed in a conventional mixer uniformly, so as to produce the photosensitive resin composition for color filter. The resulted photosensitive resin composition was evaluated according to the following evaluation methods, and the result thereof was listed as Table 2. The evaluation methods of the developing ability, heat resistance and the adhesiveness were described as follows.

Examples 2 to 7 and Comparative Examples 1 to 4

Examples 2 to 7 and comparative examples 1 to 4 were practiced with the same method as in Example 1 by using various kinds or amounts of the components for the photosensitive resin composition. The formulations and detection results thereof were listed in Table 2 rather than focusing or mentioning them in details.

Evaluation Methods

1. Developing Ability

The photosensitive resin composition was coated on a glass substrate (100 mm×100 mm) by spin-coating method, and then a drying process under reduced pressure is performed for 30 seconds under 100 mmHg, so as to form a coated film. The thickness of the coated film is 2.5 μm.

Next, 2 wt % of Potassium hydroxide was dropped on the coated film, and the dissolving time t of the coated film was evaluated. The aforementioned time (t) was equal to the developing time, and an evaluation was made according to the following criterion.

◯: t≤10 seconds.
x: 10 seconds<t.

2. Heat Resistance

The aforementioned coated film (thickness 2.5 μm) of the evaluation method 1 was exposed under 100 mJ/cm$^2$ (the trade name of the exposing device is Canon PLA-501F). Then, the film was immersed in developing liquid at 23° C. for 1 min, and washed by water. And then, the film was baked at 235° C. for 30 minutes, so as to form a pixel color layer on the glass substrate. The thickness of The pixel color layer is 2.0 μm. Next, the chromaticity (L*, a*, b*) of the pixel color layer as measured by the chromaticity meter made by Otsuka Electronics Co., LTD. (the trade name is MPCD). Thereafter, the film was baked at 250° C. for 60 minutes, and the chromaticity was measured again. A chromaticity difference (ΔEab*) was calculated according to the following formula (VII), and an evaluation was made according to the following criterion.

$$\Delta Eab^* = [(\Delta L)^2 + (\Delta a)^2 + (\Delta b)^2]^{1/2} \quad (VII)$$

◯: ΔEab*<3.
Δ: 3≤ΔEab*<6.
x: 6≤ΔEab*.

3. Adhesiveness

The aforementioned coated film (thickness 2.5 μm) of the evaluation method 1 was exposed under 100 mJ/cm$^2$ (the trade name of the exposing device is Canon PLA-501F). Then, the film was immersed in developing liquid at 23° C. for 1 min, and washed by water. And then, the film was baked at 235° C. for 30 minutes, so as to form a pixel color layer on the glass substrate. The thickness of the pixel color layer was 2.0 μm.

Next, according to the adhesiveness testing method, JIS.5400(1900)8.5, the pixel color layer was cut to 100 grid patterns by a knife. Next, the grid patterns were adhered by a tape, and then the tape was removed. An evaluation was made according to the residual grid patterns and the following criterion.

◯: 5B to 4B, and x: 3B to 0B, wherein, 5B: the grid patterns do not fall.

4B: 0%<the amount of the fallen grid patterns≤5%.

3B: 5%<the amount of the fallen grid patterns≤0.15%.

2B: 15%<the amount of the fallen grid patterns≤35%

1B: 35%<the amount of the fallen grid patterns≤65%.

0B: 65%<the amount of the fallen grid patterns≤100%.

The evaluation results of the developing ability, heat resistance, and the adhesiveness of the above Examples and Comparative Examples were shown in Table 2.

According to Table 2, in the method of producing pixels with the omission of the pre-bake process, when the photosensitive resin composition comprised the metal chelating agent (F), the color filter had a better adhesiveness with the substrate. Moreover, when the polymerized monomer of the alkali-soluble resin (A) comprised the first unsaturated monomer (a-1), the developing ability of the color filter was improved. When the polymerized monomer of the alkali-soluble resin (A) comprised the second unsaturated monomer (a-2), the color filter was provided with a better heat resistance, so as to achieve the purpose of the invention.

It should be supplemented that, although specific compounds, components, specific reactive conditions, specific processes, specific evaluation methods or specific equipments are employed as exemplary embodiments of the present invention, for illustrating the photosensitive resin composition and the application of the same of the present invention. However, as is understood by a person skilled in the art instead of limiting to the aforementioned examples, the photosensitive resin composition and the application of the same of the present invention also can be manufactured by using other compounds, components, reactive conditions, processes, analysis methods and equipment without departing from the spirit and scope of the present invention.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

TABLE 1

| Synthesis Example | Composition (Parts by Weight) | | | | | | | | | | | | |
|---|---|---|---|---|---|---|---|---|---|---|---|---|---|
| | Monomer for Polymerization | | | | | | | | | | | Initiator | Solvent |
| | (a-1) | | | (a-2) | | | | (a-3) | | | | | |
| | HOMS | MAA | AA | FA-511A | FA-512A | FA-512M | FA-513M | SM | BzMA | MMA | AA | AMBN | EEP |
| A-1 | 5 | | | 5 | | | | 40 | | 50 | | 6 | 200 |
| A-2 | | 15 | | | 10 | | | | 20 | | 55 | 6 | 200 |
| A-3 | | | 25 | | | 15 | | 20 | 40 | | | 6 | 200 |
| A-4 | 30 | 5 | | | 10 | | 10 | 45 | | | | 6 | 200 |
| A-5 | | 20 | 20 | | | 1 | | | | 20 | 39 | 6 | 200 |
| A-6 | 50 | | | | | | | | 20 | | 30 | 6 | 200 |

HOMS 2-methacryloyloxyethyl succinate monoester
MAA methacrylic acid
AA acrylic acid
FA-511A dicyclopentenyl acrylate
FA-512A dicyclopentenyloxyethyl acrylate
FA-512M dicyclopentenyloxyethyl methacrylate
FA-513M dicyclopentenyl methacrylate
SM styrene monomer
BzMA benzyl methacrylate
MMA methyl methacrylate
MA methacrylate
AMBN2,2'-azobis-2-methyl butyronitrile
EEP ethyl 3-ethoxypropionate

TABLE 2

| Composition (Parts by Weight) | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| Alkali-soluble Resin | A-1 | | 100 | | | | | | 50 | 100 | | | |
| | A-2 | | | 100 | | | | | | 50 | 100 | | |
| | A-3 | | | | 100 | | | | | | | | 100 |
| | A-4 | | | | | 100 | | | | | | | |
| | A-5 | | | | | | 100 | | | | | | |
| | A-6 | | | | | | | 100 | | | | | 100 |
| Compound Containing Vinyl Unsaturated | First Compound | B-1-1 | 5 | | | | 40 | 100 | | | | | 100 |
| | | B-1-2 | | 20 | | | 40 | | 100 | | 20 | | |
| | | B-1-3 | | | 40 | | | | | | | | |
| | | B-1-4 | | | | 60 | | | | | | | |

TABLE 2-continued

| Composition (Parts by Weight) | | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| Group(s) | Second Compound | B-2-1 | 200 | | | | | | 100 | 200 | | | |
| | | B-2-2 | | 150 | | | | | | | 150 | | |
| | | B-2-3 | | | 100 | | | | | | | 100 | |
| Photo Initiator | | C-1 | 3 | 3 | 10 | 5 | 8 | 3 | 3 | 3 | 3 | 10 | 3 |
| | | C-2 | 5 | | | | 8 | 5 | 5 | 5 | | | 5 |
| | | C-3 | | 5 | 10 | | 7 | 7 | | | 5 | 7 | |
| | | C-4 | | 4 | | | | | | | 4 | | |
| Solvent | | D-1 | 1000 | 2000 | | 1000 | 1000 | 2000 | | 1000 | 2000 | | 2000 |
| | | D-2 | | | 2000 | 500 | 1000 | | 3000 | | | 2000 | |
| Pigment | | E-1 | 150 | | | 100 | | | | 300 | 150 | | |
| | | E-2 | | 200 | | | 200 | | | | 200 | | |
| | | E-3 | | | 250 | | | 200 | | | | 250 | 200 |
| Metal Chelating Compound | | F-1 | 1 | | | | 5 | | | 20 | 25 | | |
| | | F-2 | | 10 | | | | | 20 | | | | |
| | | F-3 | | | 20 | | | | | | | | |
| | | F-4 | | | | 30 | | | | | | | |
| | | F-5 | | | | | | 50 | | | | | |
| Evaluation Method | Developing Ability | | ○ | ○ | ○ | ○ | ○ | ○ | ○ | X | ○ | X | ○ |
| | Heat Resistance | | ○ | ○ | ○ | ○ | ○ | Δ | ○ | ○ | ○ | ○ | Δ |
| | Adhesiveness | | ○ | ○ | ○ | ○ | ○ | ○ | ○ | ○ | X | X | X |

B-1-1 DPCA-120 (made by Nippon Kayaku Co., Ltd.) caprolactone modified dipentaerythrite hexaacrylate
B-1-2 DPCA-60 (made by Nippon Kayaku Co., Ltd.) caprolactone modified dipentaerythrite hexaacrylate
B-1-3 DPCA-30 (made by Nippon Kayaku Co., Ltd.) caprolactone modified dipentaerythrite hexaacrylate
B-1-4 DPCA-20 (made by Nippon Kayaku Co., Ltd.) caprolactone modified dipentaerythrite hexaacrylate
B-2-1 DPHA dipentaerythrite hexaacrylate
B-2-2 TO-1382 (made by Toagosei Co., Ltd.) dipentaerythrite pentaacrylate
B-2-3 DPEA-12 (made by Nippon Kayaku Co., Ltd.) EO modified dipentaerythrite hexaacrylate
C-1 2-methyl-1-(4-methylthio phenyl)-2-morpholino-1-propanone
C-2 2,2'-bis(2,4-dichlorophenyl)-4,4',5,5'-tetraphenyl-biimidazole
C-3 4,4'-bis(diethylamino)benzophenone
C-4 1-[4-(benzoyl)phenyl]-heptane-1,2-dione 2-(O-benzoyloxime)
D-1 propylene glycol monomethylether acetate
D-2 ethyl 3-ethoxypropionate
E-1 C.I. Pigment R254/C.I. Pigment Y139 = 80/20
E-2 C.I. Pigment G36/C.I. Pigment Y150 = 60/40
E-3 C.I. Pigment B15:6
F-1 tris(ethyl acetoacetato) aluminum
F-2 di-i-propoxy bisacetylacetonato zirconium
F-3 di-n-butoxy bis(triethanolamine) titanium
F-4 isopropyl tris(dodecylbenzenesulfonyl) titanium
F-5 tetraisopropyl bis(dioctyl phosphate) titanate

What is claimed is:

1. A photosensitive resin composition, comprising:
an alkali-soluble resin (A);
a compound (B) containing vinyl unsaturated group(s);
a photo initiator (C);
an organic solvent (D);
a pigment (E); and
a metal chelating agent (F); and
wherein the compound (B) includes a first compound, the first compound is synthesized from caprolactone-modified polyol and (meth)acrylic acid, and based on the alkali-soluble resin (A) as 100 parts by weight, an amount of the metal chelating agent (F) is larger than 5 parts by weight and less than or equal to 50 parts by weight.

2. The photosensitive resin composition of claim 1, the first compound comprising a structure of the formula (I):

wherein $R_1$ and $R_2$ respectively is a hydrogen atom or a methyl group, m is an integer of 1 to 2, (a+b) is an integer of 2 to 6, and a is an integer of 1 to 6, and b is an integer of 0 to 5.

3. The photosensitive resin composition of claim 1, wherein the compound (B) containing vinyl unsaturated group(s) further comprising a second compound, and the second compound comprising a functional group of the formula (II):

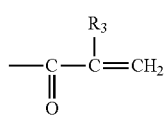

wherein $R_3$ is a hydrogen atom or a methyl group.

4. The photosensitive resin composition of claim 1, based on the alkali-soluble resin (A) as 100 parts by weight, a

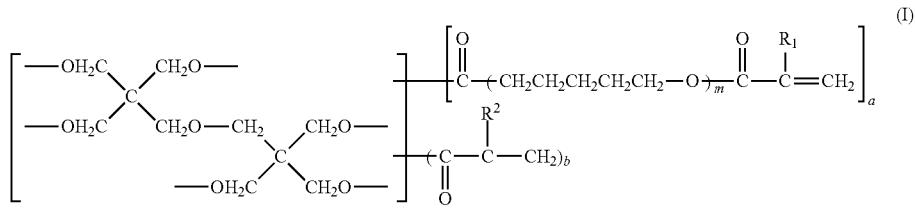

amount of the compound (B) containing vinyl unsaturated group(s) is 10 to 500 parts by weight, an amount of the photo initiator (C) is 2 to 200 parts by weight, an amount of the organic solvent (D) is 500 to 5000 parts by weight, and an amount of the pigment (E) is 100 to 800 parts by weight.

5. The photosensitive resin composition of claim 1, based on the alkali-soluble resin (A) as 100 parts by weight, an amount of the first compound is 5 to 100 parts by weight.

6. The photosensitive resin composition of claim 3, based on the alkali-soluble resin (A) as 100 parts by weight, an amount of the second compound is 5 to 400 parts by weight.

7. The photosensitive resin composition of claim 1, wherein the alkali-soluble resin (A) is a compound polymerized with a mixture, and the mixture includes a first unsaturated monomer containing a carboxylic acid group, a second unsaturated monomer containing an alicyclic group, and a third unsaturated monomer.

8. The photosensitive resin composition of claim 7, based on the mixture as 100 parts by weight, the first unsaturated monomer is 5 to 50 parts by weight, the second unsaturated monomer is 1 to 20 parts by weight, and the third unsaturated monomer is 30 to 94 parts by weight.

9. A color filter comprising a pixel color layer formed by the photosensitive resin composition of claim 1 after a photolithography, wherein the photosensitive resin composition comprises an alkali-soluble resin (A), a compound (B) containing vinyl unsaturated group(s), a photo initiator (C), an organic solvent (D), a pigment (E) and a metal chelating agent (F), wherein the compound (B) includes a first compound, and the first compound is synthesized from caprolactone-modified polyol and (meth)acrylic acid.

10. The color filter of claim 9, wherein the first compound comprising a structure of the formula (I):

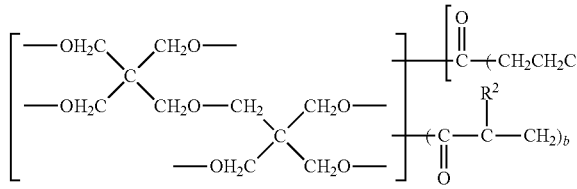

wherein $R_1$ and $R_2$ respectively is a hydrogen atom or a methyl group, m is an integer of 1 to 2, (a+b) is an integer of 2 to 6, and a is an integer of 1 to 6, and b is an integer of 0 to 5.

11. The color filter of claim 9, wherein the compound (B) containing vinyl unsaturated group(s) further comprising a second compound, and the second compound comprising a functional group of the formula (II):

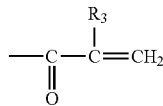

wherein $R_3$ is a hydrogen atom or a methyl group.

12. The color filter of claim 9, based on the alkali-soluble resin (A) as 100 parts by weight, a amount of the compound (B) containing vinyl unsaturated group(s) is 10 to 500 parts by weight, an amount of the photo initiator (C) is 2 to 200 parts by weight, an amount of the organic solvent (D) is 500 to 5000 parts by weight, an amount of the pigment (E) is 100 to 800 parts by weight, and an amount of the metal chelating agent (F) is 1 to 50 parts by weight.

13. The color filter of claim 9, based on the alkali-soluble resin (A) as 100 parts by weight, an amount of the first compound is 5 to 100 parts by weight.

14. The color filter of claim 11, based on the alkali-soluble resin (A) as 100 parts by weight, an amount of the second compound is 5 to 400 parts by weight.

15. The color filter of claim 9, wherein the alkali-soluble resin (A) is a compound polymerized with a mixture, and the mixture includes a first unsaturated monomer containing a carboxylic acid group, a second unsaturated monomer containing an alicyclic group, and a third unsaturated monomer.

16. The color filter of claim 15, based on the mixture as 100 parts by weight, the first unsaturated monomer is 5 to 50 parts by weight, the second unsaturated monomer is 1 to 20 parts by weight, and the third unsaturated monomer is 30 to 94 parts by weight.

17. A liquid crystal display device comprising a color filter of claim 9.